United States Patent [19]

Ratzokwski et al.

[11] Patent Number: 5,073,145
[45] Date of Patent: Dec. 17, 1991

[54] JOINT MOVABLE IN ALL DIRECTIONS, ESPECIALLY FOR LINKAGES AND CARDAN SHAFTS

[75] Inventors: Elke Ratzokwski, Bad Essen; Keit Wagener, Bissendorf, both of Fed. Rep. of Germany

[73] Assignee: Lemförder Metallwaren AG, Lemförde, Fed. Rep. of Germany

[21] Appl. No.: 456,980

[22] Filed: Dec. 26, 1989

[30] Foreign Application Priority Data

Dec. 24, 1988 [DE] Fed. Rep. of Germany ....... 3843825

[51] Int. Cl.$^5$ .............................................. F16D 3/18
[52] U.S. Cl. .................................... 464/157; 464/106
[58] Field of Search ............... 403/133, 141, 142, 361; 464/51, 87, 101, 106, 149, 157, 185, 904, 181

[56] References Cited

U.S. PATENT DOCUMENTS

| 1,397,951 | 11/1921 | Fischer | 464/157 |
| 1,457,219 | 5/1923 | Dusseau | 464/106 |
| 1,625,511 | 4/1927 | Ungerer | 464/106 |
| 2,480,039 | 8/1949 | Miller, Jr. | 464/157 X |
| 2,892,327 | 6/1959 | Kressin | 464/87 |
| 3,320,771 | 5/1967 | Roethlisberger et al. | 464/157 |
| 3,512,375 | 5/1978 | Madarasz | 464/106 |
| 3,805,302 | 4/1974 | Mathys | 403/133 |
| 4,280,339 | 7/1981 | Stuemky | 464/157 X |
| 4,560,368 | 12/1985 | Sherman, II et al. | 464/101 |
| 4,840,601 | 6/1989 | Denman | 464/157 |

Primary Examiner—Daniel P. Stodola
Assistant Examiner—Charles T. Riggs, Jr.
Attorney, Agent, or Firm—McGlew & Tuttle

[57] ABSTRACT

A joint movable in all directions for linkages and Cardan shafts. The joint includes only two parts of identical design made from an elastically deformable plastic, wherein the coupling members of identical design are fitted into each other at a 90° angle while elastic deformation takes place.

5 Claims, 4 Drawing Sheets

JOINT MOVABLE IN ALL DIRECTIONS, ESPECIALLY FOR LINKAGES AND CARDAN SHAFTS

FIELD OF THE INVENTION

The present invention pertains to a joint movable in all directions for general use in linkages and Cardan shafts in actuating drives, control units, actuators, regulators, and the like.

Such a joint is preferably intended for use in vehicles. Use in office equipment, household appliances, laboratory instruments, printing machines, paper machines, textile machines, toys, electrical, electronic and other devices, in which known universal joints can be used and in which the torques occurring are relatively low, is also contemplated.

BACKGROUND OF THE INVENTION

Universal joints of the standard design consist of two fork parts and a spider element with the link pins which engage with joint eyelets of the fork arms. A simplified design of a universal joint has been known from West German Patent Specification No. 32,678 and U.S. Pat. Specification No. 3,089,232. Here, the coupling members for the shaft or linkage parts to be joined are cast in one piece at the ends of the parts, and the casting mold also fixes the parts to be cast around and forms a joint body. A comparable design is also shown from West German Patent Specification No. 37,20,852, in which a joint body with a bearing journal molded in one piece is formed by filling the casting mold with a self-curing plastic.

In every known case, the end parts of the Cardan shaft and of the linkage that are to be joined by the joint have different designs and are connected to one another by at least one other component.

SUMMARY AND OBJECT OF THE INVENTION

It is an object of the present invention to provide a joint movable in all directions for Cardan shafts or linkages for transmitting a relatively low torque, which can be produced at low cost, and can be installed and removed in a short time, so that it can also be used as a quick coupling at the same time.

The inventive joint includes a first joint part and a second joint part, each joint part being formed of elastically deformable plastic. Each joint part includes coupling members, the coupling members of the first joint part being substantially identical to the coupling parts of the second coupling member. The first coupling member is rotated with respect to the second coupling member by 90° and the first and second joint parts are connected by elastic deformation of the coupling members.

Thus, according to this invention, the joint consists of two parts of identical design, which can be produced from a plastic that can be processed easily, e.g., a polyamide possessing limited elastic properties. All parts of the joint can thus be produced in the same mold. The two joint parts forming the joint are connected to one another by fitting and snapping together the two parts while the latter undergo elastic deformation.

In a preferred embodiment, each of the two joint parts to be connected has coupling members consisting of a fork with a link pin each, arranged coaxially to one another on the outside of each of the two fork arms and a fork with a slot that is open toward the free end in each of the two fork arms for receiving the link pin of the other joint part, wherein the fork arms with the link pins are spherical on the outside and engage with another spherical contour of the fork arms provided with the slots. To limit the bending angle, the throats of the slots in the fork arms form stops for the link pins of the other joint part. At the end turned away from the coupling members, the joint parts are provided with fastening means for a linkage part.

The characteristics of the present invention make it possible to produce a joint movable in all directions from only two parts, made of a plastic material, in a very large lot size and efficiently, so that joints that can be moved in all directions can be assembled from these parts for greatly different applications. With a limited bending angle, such a joint has satisfactory universal joint characteristics, can be produced in very small, but also larger sizes, is maintenance-free, operates without lubrication, and is electrically insulating and corrosion resistant. It has very light weight and is resistant to many corrosive media. The ease with which the joint can be fitted together and the fact that it can also be disassembled just as easily make it possible to provide joints having the design characteristics according to the present invention even as quick couplings in linkages and the like, especially when such linkages require a joint movable in all directions to compensate for deflecting movements.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
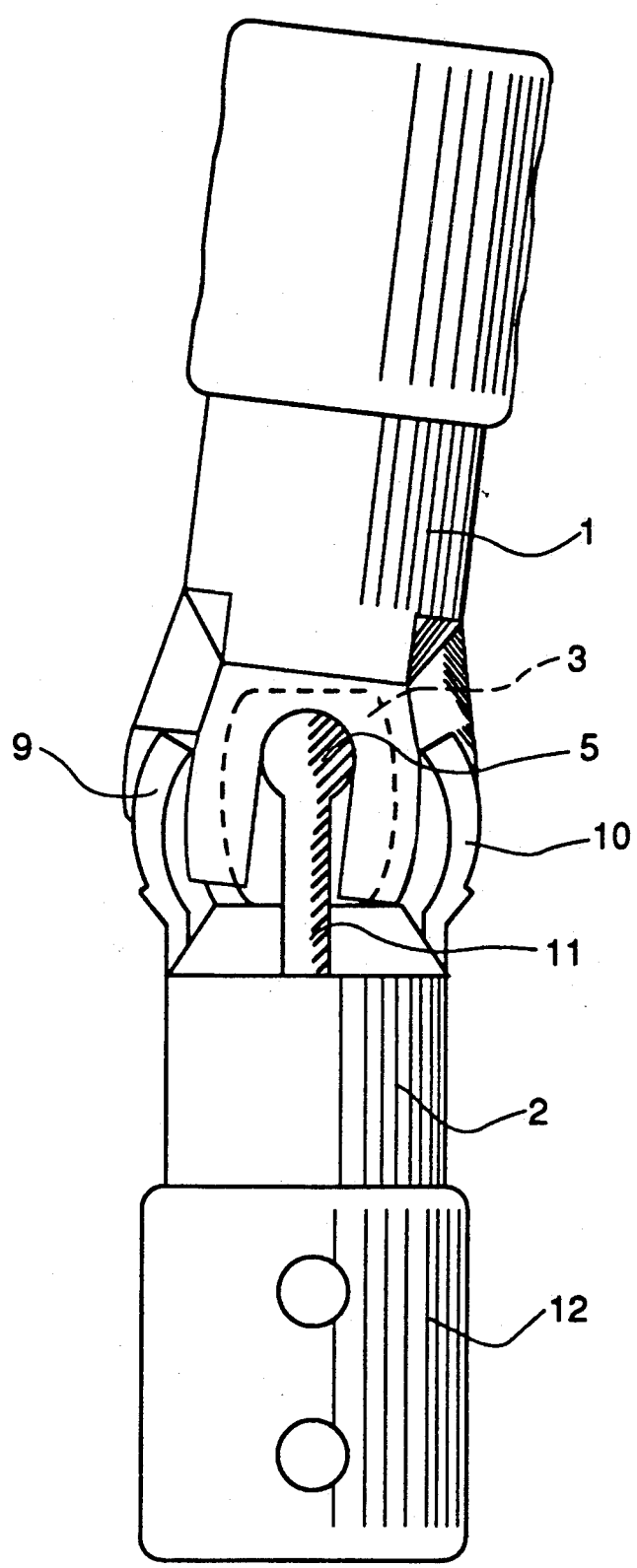
FIG. 1 is a side view of a joint according to the present invention.
Figure 2:
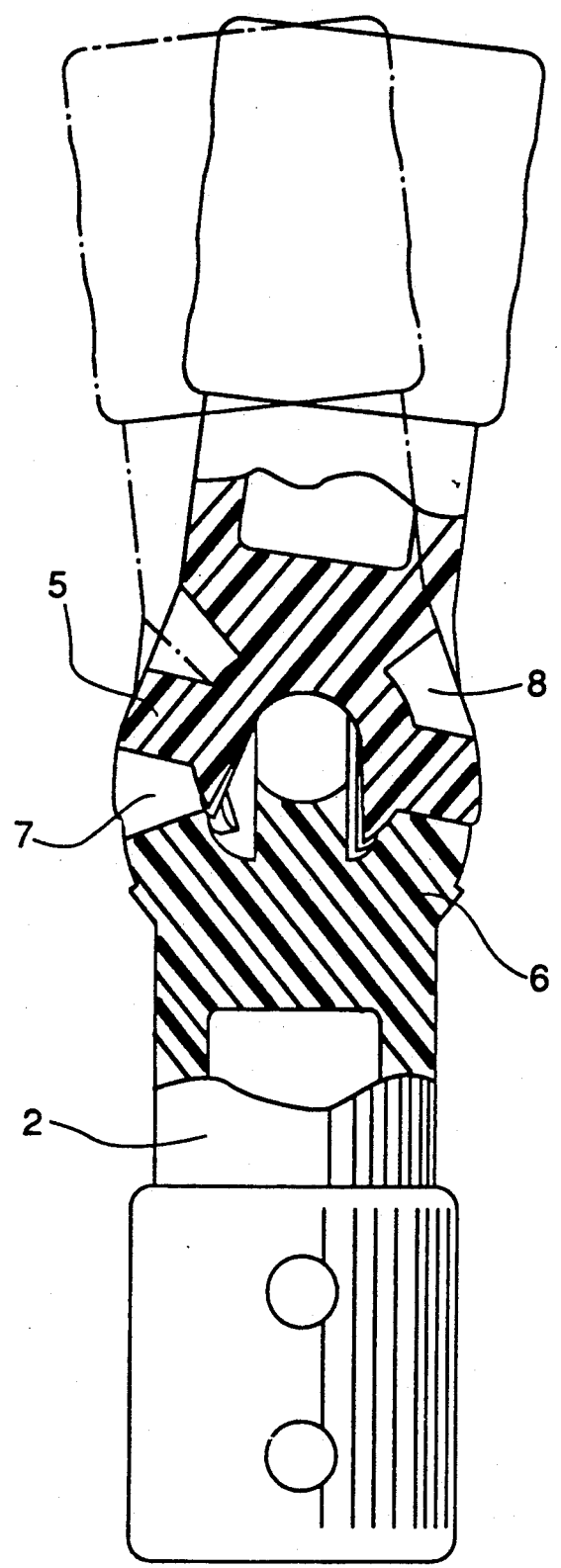
FIG. 2 is a longitudinal partially sectionional view in an axial plane.
Figure 3:
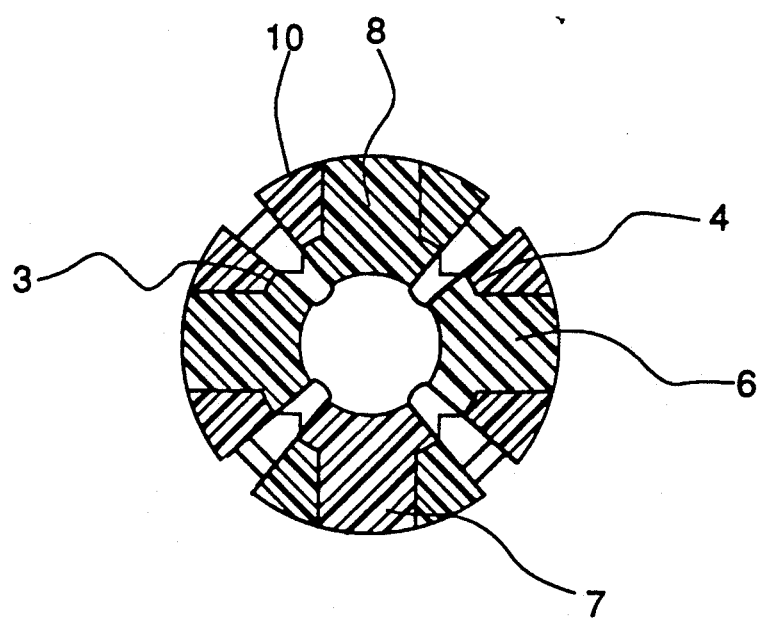
FIG. 3 is a cross sectional view in a plane through the axis of the joint.
Figure 4:
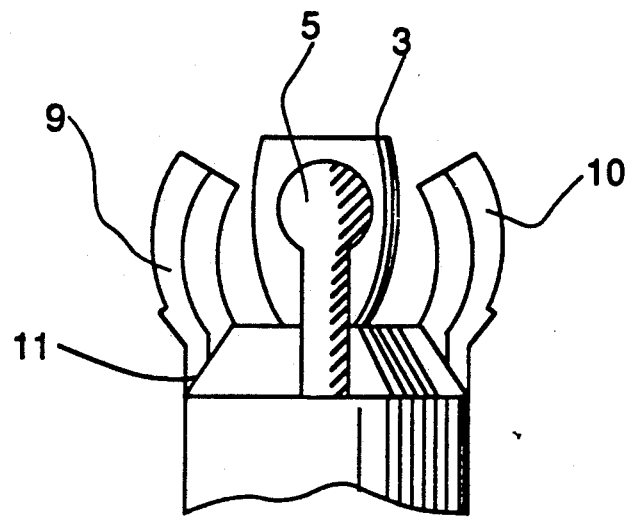
FIG. 4 is a side view of the coupling members on a joint part.
Figure 5:
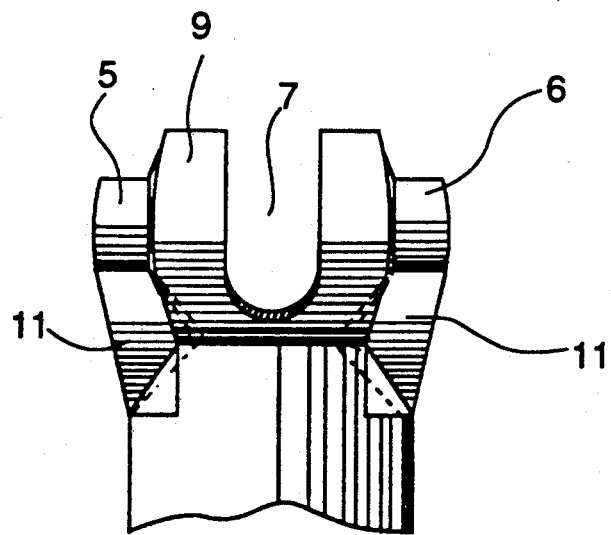
FIG. 5 is a side view of the coupling member on a joint part rotated through 90° relative to FIG. 4.

The joint movable in all directions consists of only two joint parts 1 and 2, having ends which face each other and can be connected to each other via coupling members of identical design. Both joint parts are made from a suitable plastic, e.g., a polyamide or the like, in an injection mold or casting mold. The coupling members on each of the two joint parts 1 and 2 consist of a fork with a link pin 5 and 6 each arranged coaxially to each other on the outside of each of the two fork arms 3 and 4 and of a second fork with a slot 7 and 8 that is open toward the free end in each of the two fork members 9 and 10 for receiving the link pins 5 and 6 of the other fork part. For greater clarity, the lead lines of the reference numerals in FIG. 3 are drawn only to the coupling members of one of the joint parts and this joint part is set off against the other joint part by crosshatching in order to create greater clarity. The fork arms 3 and 4 with the link pins 5 and 6 made in one piece are spherical on the outside and engage with an inner spherical contour of the fork members 9 and 10 with the slots 7 and 8 in them, thus forming a ball joint whose mobility is guaranteed by a limited freedom of movement of the link pins 5 and 6 in the slots 7 and 8. Thus, the throats at the bottom of the slots 7 and 8 form stops for the link pins 5 and 6, by which the bending angle of the joint is limited. The fork arms 3 and 4 with the link pins form an inner ball of a joint body, which is surrounded by the spherical internal design of the fork members 9 and 10. Fork members 3 and 4 and the link pins can be inserted into the outer ball design by a snapping movement while the fork members 9 and 10 undergo elastic deformation. The limitation of the bending angle is apparent from FIG. 2. Reinforcing ribs 11 may be provided on the outside of the fork arms 3 and 4 carrying the link pins 5 and 6 in order to stiffen the joint.

The above-described coupling members of the joint parts can be molded in one piece directly at the ends of Cardan shafts, linkages or the like. However, the coupling members are advantageously provided on joint parts whose ends opposite the coupling members have means for connection to a shaft, a linkage part or the like. The drawing shows sleeves 12 molded in one piece with internal bores, into which rod ends, shaft ends or the like can be inserted and be fixed by cotter pins.

While specific embodiments of the invention have been shown and described in detail to illustrate the application of the principles of the invention, it will be understood that the invention may be embodied otherwise without departing from such principles.

What is claimed is:

1. A joint movable in all directions for linkages and Cardan shafts, comprising a two part joint including a first joint part; and a second joint part, each of said first and second joint parts being formed substantially integral of an elastically deformable plastic, said first joint part including coupling members which are substantially identical to coupling members of said second joint part, said first joint part being oriented 90° with respect to said second joint part and being fitted into said second joint part by elastic deformation of said coupling members said joint allowing relative deflection of elements connected to said first and second joint parts in an entire rotational range of 360°, said coupling members of each of said first and second joint parts include a forked structure with link pins, each link pin arranged co-axially with respect to the other on an outside portion of two fork arms forming said forked structure, said forked structure including fork members defining a slot open at a free end of the joint for receiving a link pin of the other joint, said fork arms having an outer surface which is substantially spherical and said fork members having a spherical contour, said fork members defining a continuation of said slot and engaging the outer spherical surface of the fork arms of the other joint part.

2. A joint according to claim 1, wherein said slot of said fork members includes a slot throat forming a stop for said link pins of the other joint member to limit the bending angle of the joint.

3. A joint according to claim 1, wherein each of said first and second joint parts includes fastening means for a linkage part at the joint part end that is turned away from the coupling members.

4. A joint movable in all direction for linkages and Cardan shafts, comprising: a two part joint structure including first and second joint parts, each of said first and second joint parts being formed of an elastically deformable plastic, said first joint part including coupling member which are substantially identical to coupling members to said second joint part, said joint parts being connected in a head-on-head relationship with one joint part being oriented 90° offset relative to another joint part, said joint parts being connected by elastic deformation of said coupling members, said coupling members of said first and second joint parts having a main fork element having including a first fork arm and a second fork arm defining a slot, first and second link pins forming a part of said fork elements at an outer side of said fork elements and fork members positioned on each side of said main fork element and positioned on each side of said slot, said fork arms defining an outer spherical surface and said fork members defining an inner spherical surface.

5. A joint movable in all directions for linkages and Cardan shafts, comprising: first and second joint parts, each of said first and second parts being formed integral of an elastically deformable plastic, said first joint part including coupling members which are substantially identical to coupling members of said second joint part, said joint parts being connected to each other in a head-on-head relationship with on joint part being oriented 90° relative to another joint part, said joint parts being connected by elastic deformation of said coupling members, said coupling members of said first and second joint parts including a main fork element having a first fork arm and a second fork arm defining a slot, first and second link pins forming a part of said fork elements at an outer side of said fork elements and fork members positioned on each side of said main fork element and positioned on each side of said slot, said fork arms defining an outer spherical surface and said fork members defining an inner spherical surface.

* * * * *